(12) United States Patent
Baek

(10) Patent No.: US 7,184,113 B2
(45) Date of Patent: Feb. 27, 2007

(54) TRANSFLECTIVE LIQUID CRYSTAL DISPLAY DEVICE AND FABRICATING METHOD THEREOF

(75) Inventor: Heum-il Baek, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 106 days.

(21) Appl. No.: 10/267,744

(22) Filed: Oct. 10, 2002

(65) Prior Publication Data

US 2003/0071944 A1   Apr. 17, 2003

(30) Foreign Application Priority Data

Oct. 11, 2001   (KR)   ............................... 2001-62753

(51) Int. Cl.
*G02F 1/1368* (2006.01)
*G02F 1/1335* (2006.01)
*H01L 29/12* (2006.01)

(52) U.S. Cl. .......................... 349/114; 349/43; 349/47; 349/113; 257/59

(58) Field of Classification Search ................. 349/43, 349/42, 113, 114, 38, 46, 47; 257/59, 72; 345/92
See application file for complete search history.

(56) References Cited

U.S. PATENT DOCUMENTS 5,446,562 A * 8/1995 Sato ............................ 349/42
5,724,107 A * 3/1998 Nishikawa et al. ........... 349/38
5,835,172 A * 11/1998 Yeo et al. ..................... 349/46
6,061,111 A * 5/2000 Kataoka et al. ............. 349/113
6,259,500 B1 * 7/2001 Kijima et al. ............... 349/113

FOREIGN PATENT DOCUMENTS

| JP | 10-311982 | 11/1998 |
| KR | 1999 84316 | 12/1999 |
| KR | 2001-87657 | 9/2001 |

OTHER PUBLICATIONS

Yamaguichi et al., "A Simple Reflective TFT-LCD Fabrication Using Four Photomask Processes", SID 98 DIGEST 20.2, p. 297. ###.

* cited by examiner

*Primary Examiner*—Toan Ton
*Assistant Examiner*—Tai Duong
(74) *Attorney, Agent, or Firm*—McKenna Long & Aldridge LLP

(57) ABSTRACT

An array substrate for a transflective liquid crystal display device, including: a substrate; a data line and a gate line on the substrate, the data line and the gate line defining a pixel region; a thin film transistor connected to the data line and the gate line, the thin film transistor including source and drain electrodes, an ohmic contact layer on the source and drain electrodes, an active layer and a gate electrode over the active layer; a reflective plate at the pixel region, the reflective plate having a transmissive hole; and a pixel electrode over the reflective plate, the pixel electrode being connected to the drain electrode.

10 Claims, 9 Drawing Sheets

TRANSFLECTIVE LIQUID CRYSTAL DISPLAY DEVICE AND FABRICATING METHOD THEREOF

This application claims the benefit of Korean Patent Application No. 2001-62753, filed on Oct. 11, 2001, which is hereby incorporated by reference for all purposes as if fully set forth herein.

BACKGROUND OF THE INVENTION

1. Field of the Invention

The present invention relates to a liquid crystal display (LCD) device, and more particularly to a transflective LCD device that selectively uses reflective and transmissive modes.

2. Discussion of the Related Art

Generally, transflective LCD devices function as both transmissive and reflective LCD devices at the same time. Since the transflective LCD devices can use both light of a backlight, and exterior natural or artificial light the transflective LCD devices are not restricted from circumstances and a power consumption of the transflective LCD devices is reduced.

FIG. 1 is a schematic perspective view of a related art transflective color liquid crystal display device.

In FIG. 1, the related art transflective LCD device 29 includes an upper substrate 15 having a transparent common electrode 13 on a black matrix 19 and a color filter layer 17, and a lower substrate 30 having a switching device "T" and gate line 34 and data line 46. The lower substrate 30 also has a pixel region "P" where a reflective plate 52 including a transmissive hole "A" and a transparent pixel electrode 64 are formed. The pixel region "P" including a reflective portion "C" is defined by the gate line 34 and the data line 46. Further, a liquid crystal layer 23 is interposed between the upper and lower substrates 15 and 30.

FIG. 2 is a schematic cross-sectional view of a related art transflective liquid crystal display device.

In FIG. 2, a related art transflective LCD device 29 includes an upper substrate 15 where a common electrode 13 is formed, a lower substrate 30 where a reflective plate 52 having a transmissive hole "A" and a transparent pixel electrode 64 over or under the reflective plate 52 are formed, a liquid crystal layer 23 interposed between the upper and lower substrates 15 and 30, and a backlight 41 under the lower substrate 30. When the related art transflective LCD device 29 is operated in a reflective mode, external natural or artificial light is used as a light source.

Operation of the related art transflective LCD device 29 for reflective and transflective modes will be illustrated considering the above-mentioned structure.

In the reflective mode, the I related art transflective LCD device 29 uses external natural or artificial light. Light "B" incident on the upper substrate 15 is reflected at the reflective plate 52 and passes through the liquid crystal layer 23. The liquid crystal molecules in the liquid crystal layer 23 are aligned by an electric field between the reflective plate 52 and the common electrode 13. Here, the transmission of the light "B" through the liquid crystal layer 23 is controlled according to the alignment of the liquid crystal layer 23 and images are displayed.

In the transmissive mode, light "F" from the backlight 41 under the lower substrate 21 is used as a light source. The light "F" emitted from the backlight 41 is incident on the liquid crystal layer 23 through the transparent pixel electrode 64. Transmission of the light "F" through the liquid crystal layer 23 is controlled according to an alignment of the liquid crystal molecules in the liquid crystal layer 23 driven by an electric field between the pixel electrode 64 under the transmissive hole "A" and the common electrode 13. Hence, images can be displayed.

FIG. 3 is a schematic plan view of an array substrate for a related art transflective liquid crystal display device.

In FIG. 3, a lower substrate 30, referred to as an array substrate, includes a thin film transistors (TFT) "T" in matrix. The TFTs act as switching devices. Each TFT "T" is connected to a gate line 34 and a data line 46. Here, a pixel region "P" is defined by the gate line 34 and the data line 46. A storage capacitor "S" is formed over a portion of the gate line 34 and connected in parallel to a transparent pixel electrode 64 of the pixel region "P". A gate pad 36 is formed at one end of the gate line 34 and a data pad 48 is formed at one end of the data line 46. External signals are applied to the gate pad 36 and the data pad 48. The TFT "T" includes a gate electrode 32, an active layer 40 over the gate electrode 32, and source and drain electrodes 42 and 44.

FIGS. 4A to 4D are schematic cross-sectional views illustrating a fabricating process of an array substrate for a related art transflective liquid crystal display device. FIGS. 4A to 4C are taken along the line IV—IV of FIG. 3.

In FIG. 4A, after a gate electrode 32, a gate line 34 (of FIG. 3) and a gate pad 36 are formed on a substrate 30 through a first mask process, a gate insulating layer 38, i.e., a first insulating layer, is formed thereon. The gate pad 36 is disposed at one end of the gate line 34 (of FIG. 3). Next, an active layer 40b of amorphous silicon and an ohmic contact layer 40a of impurity-doped amorphous silicon are formed on the gate insulating layer 38 over the gate electrode 32 through a second mask process. The active layer 40b and the ohmic contact layer 40a of an island shape constitute a semiconductor layer 40. Source and drain electrodes 42 and 44 are formed on the ohmic contact layer 40a through a third mask process. A data line 46 connected to the source electrode 42 and a data pad 48 at one end of the data line 46 are formed at the same time. The semiconductor layer 40 is completed through patterning a portion of the ohmic contact layer 40a exposed between the source and drain electrodes 42 and 44 by using the source and drain electrodes 42 and 44 as an etching mask. Here, a capacitor electrode 50 (of FIG. 3) of an island shape also may be formed over the gate line 34 (of FIG. 3).

In FIG. 4B, a second insulating layer 50 is formed on an entire surface of the substrate 30 through depositing an insulating material. A reflective electrode 52 having a transmissive hole "A" is formed on the second insulating layer 50 through a fourth mask process of depositing and patterning a metallic material of high reflectance such as aluminum (Al).

In FIG. 4C, after a third insulating layer 54 is formed on an entire surface of the substrate 30, a drain contact hole 56, a transmissive groove 58, a gate pad contact hole 60 and a data pad contact hole 62 are formed through a fifth mask process of simultaneously patterning the first, second and third insulating layers 38, 50 and 54. The drain contact hole 56 exposes the drain electrode 44; a transmissive groove 58 corresponds to the transmissive hole "A"; a gate pad contact hole 60 exposes the gate pad 36; and a data pad contact hole 62 exposes the data pad 48.

In FIG. 4D, a pixel electrode 64 connected to the drain electrode 44 is formed on the third insulating layer 54 at the pixel region "P" through a sixth mask process of patterning a transparent conductive metallic material. A gate pad terminal 66 contacting the gate pad 36 and a data pad terminal 68 contacting the data pad 48 are formed at the same time. An align key (not shown) is simultaneously formed at a non-display region during a process of forming the gate line 34 and used to align a mask and the substrate 30.

Since the array substrate for the related art transflective LCD device is fabricated through six mask processes, the processes are complex. Accordingly, the production yield is low and the production cost is high.

SUMMARY OF THE INVENTION

Accordingly, the present invention is directed to a liquid crystal display device that substantially obviates one or more of problems due to limitations and disadvantages of the related art.

An object of the present invention is to improve the production yield and the production cost through simplifying the fabricating process.

An advantage of the present invention is to provide an array substrate for a transflective liquid crystal display device and a fabricating method thereof in which the thin film transistor has a staggered top gate type.

Another advantage of the present invention is to provide an array substrate for a transflective liquid crystal display device and a fabricating method thereof in which the reflective plate has an unevenness to improve the display quality.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a transflective liquid crystal display device includes: a substrate; a data line and a gate line on the substrate, the data line and the gate line defining a pixel region; a thin film transistor connected to the data line and the gate line, the thin film transistor including source and drain electrodes, an ohmic contact layer on the source and drain electrodes, an active layer and a gate electrode over the active layer; a reflective plate at the pixel region, the reflective plate having a transmissive hole; and a pixel electrode over the reflective plate, the pixel electrode being connected to the drain electrode.

In another aspect of the present invention, a fabricating method of an array substrate for a transflective liquid crystal display device includes: sequentially depositing a first metal layer and an impurity-doped amorphous silicon layer on a substrate; etching the first metal layer and the impurity-doped amorphous silicon layer through a first mask process to form source and drain electrodes, a data line and an ohmic contact layer; sequentially depositing an amorphous silicon layer, a first insulating layer and a second metal layer on the source and drain electrodes, the data line and the ohmic contact layer; etching the amorphous silicon layer, the first insulating layer and the second metal layer through a second mask process to form a gate electrode, a gate line and an active layer, the gate line defining a pixel region with the data line; forming a second insulating layer on the gate electrode and the gate line; forming a reflective plate on the second insulating layer at the pixel region through a third mask process, the reflective plate having a transmissive hole; depositing a third insulating layer on the reflective plate; etching the third insulating layer through a fourth mask process to form a drain contact hole exposing the drain electrode and a transmissive groove corresponding to the transmissive hole; and forming a pixel electrode on the third insulating layer through a fifth mask process, the pixel electrode being connected to the drain electrode through the drain contact hole.

In another aspect, an array substrate for a transflective liquid crystal display device includes: a substrate; a data line and a gate line on the substrate, the data line and the gate line defining a pixel region; a thin film transistor connected to the data line and the gate line, the thin film transistor including source and drain electrodes, an ohmic contact layer on the source and drain electrodes, an active layer and a gate electrode over the active layer; a reflective plate at the pixel region, the reflective plate having a transmissive hole and an unevenness; a plurality of convex patterns under the reflective plate; and a pixel electrode over the reflective plate, the pixel electrode being connected to the drain electrode.

In another aspect, a fabricating method of an array substrate for a transflective liquid crystal display device includes: sequentially depositing a first metal layer and an impurity-doped amorphous silicon layer on a substrate; etching the first metal layer and the impurity-doped amorphous silicon layer through a first mask process to form source and drain electrodes, a data line and an ohmic contact layer; sequentially depositing an amorphous silicon layer, a first insulating layer and a second metal layer on the source and drain electrodes, the data line and the ohmic contact layer; etching the amorphous silicon layer, the first insulating layer and the second metal layer through a second mask process to form a gate electrode, a gate line, an active layer and a plurality of convex patterns, the gate line defining a pixel region with the data line; forming a second insulating layer on the gate electrode, the gate line and the plurality of convex patterns; forming a reflective plate on the second insulating layer at the pixel region through a third mask process, the reflective plate having a transmissive hole and an unevenness; depositing a third insulating layer on the reflective plate; etching the third insulating layer through a fourth mask process to form a drain contact hole exposing the drain electrode and a transmissive groove corresponding to the transmissive hole; and forming a pixel electrode on the third insulating layer through a fifth mask process, the pixel electrode being connected to the drain electrode through the drain contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

In the drawings.

DETAILED DESCRIPTION OF THE ILLUSTRATED EMBODIMENTS

Reference will now be made in detail to an embodiment of the present invention, example of which are illustrated in the accompanying drawings. Wherever possible, similar reference numbers will be used throughout the drawings to refer to the same or like parts.

Figure 1:
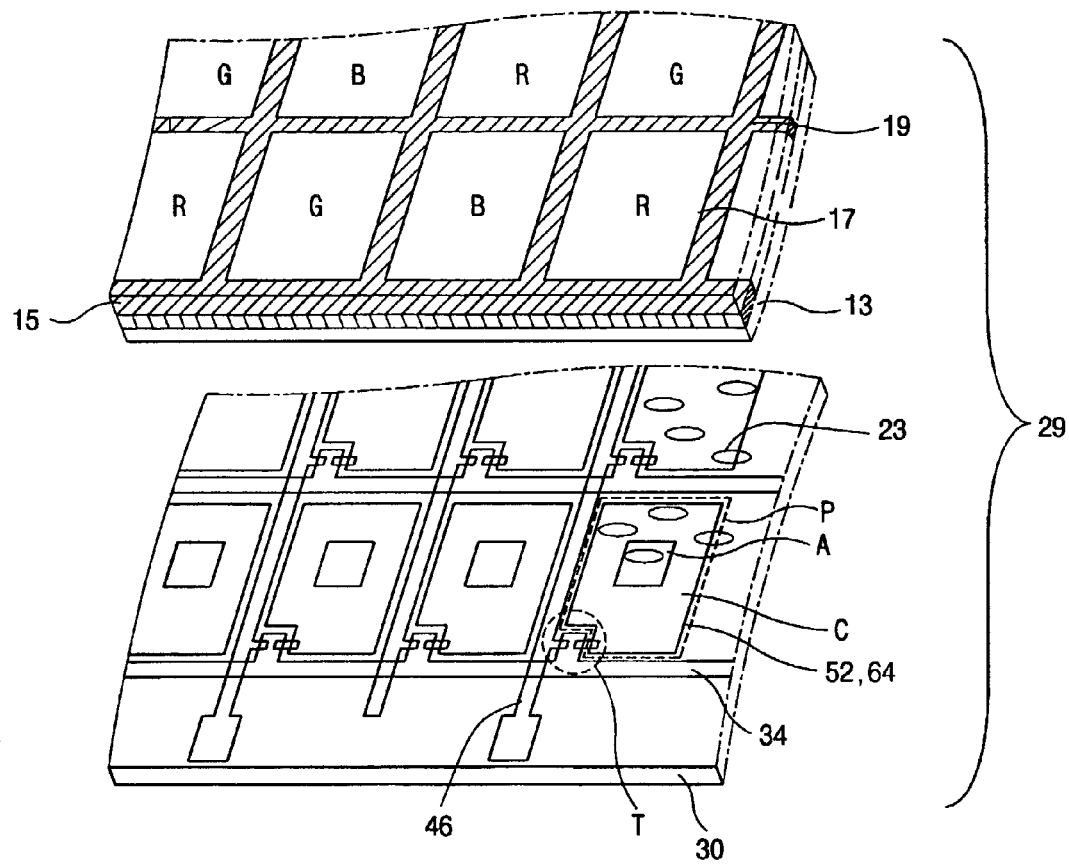
FIG. 1 is a schematic perspective view of a related art transflective color liquid crystal display device.
Figure 2:
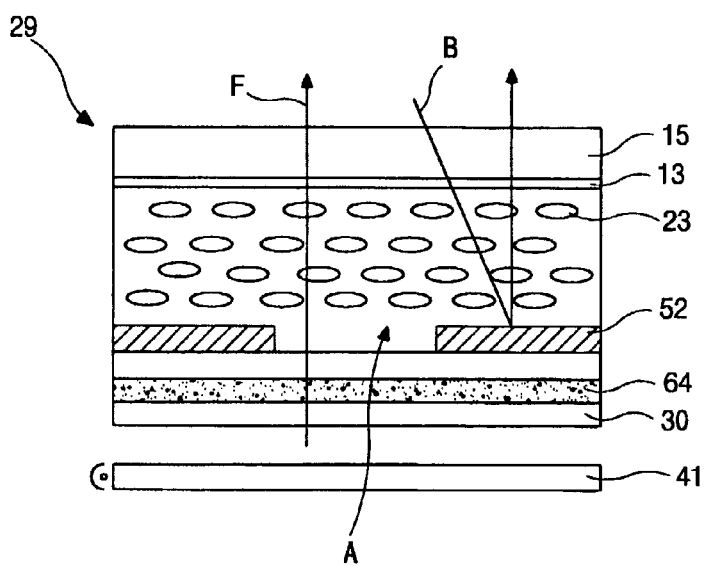
FIG. 2 is a schematic cross-sectional view of a related art transflective liquid crystal display device.
Figure 3:
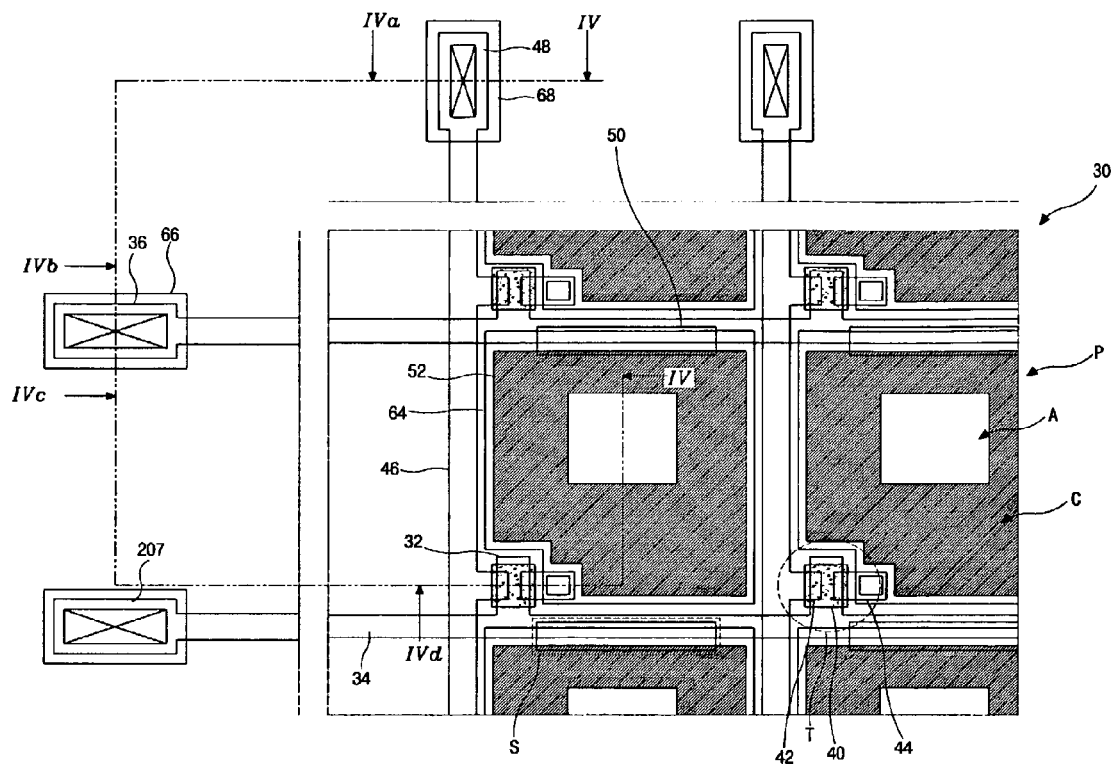
FIG. 3 is a schematic plan view of an array substrate for a related art transflective liquid crystal display device.
Figure 4A:
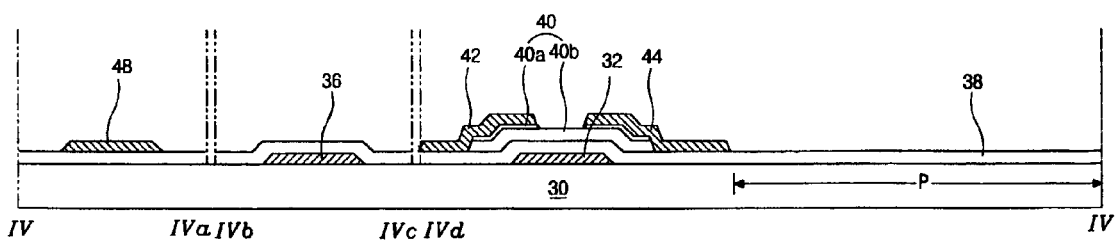
FIGS. 4A to 4D are schematic cross-sectional views illustrating a fabricating process of an array substrate for a related art transflective liquid crystal display device.
Figure 4B:
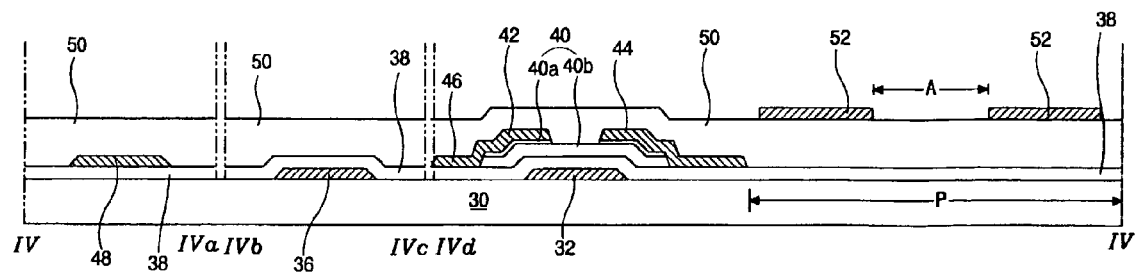
Figure 4C:
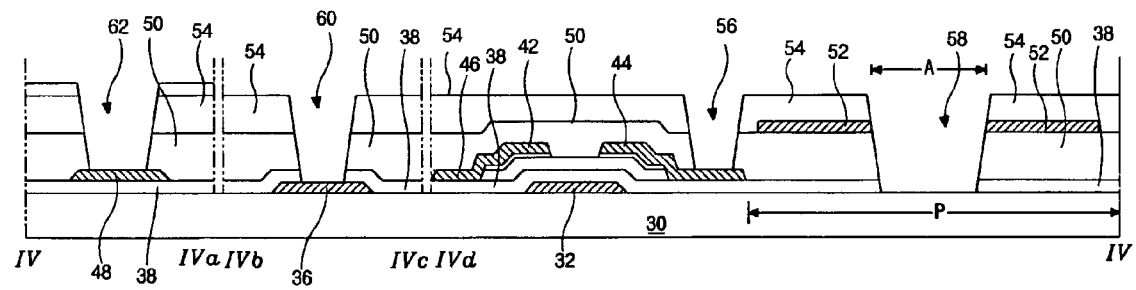
Figure 4D:
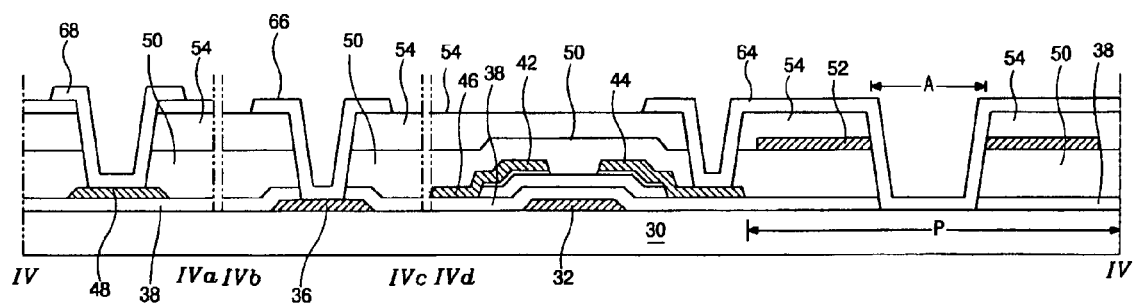
Figure 5:
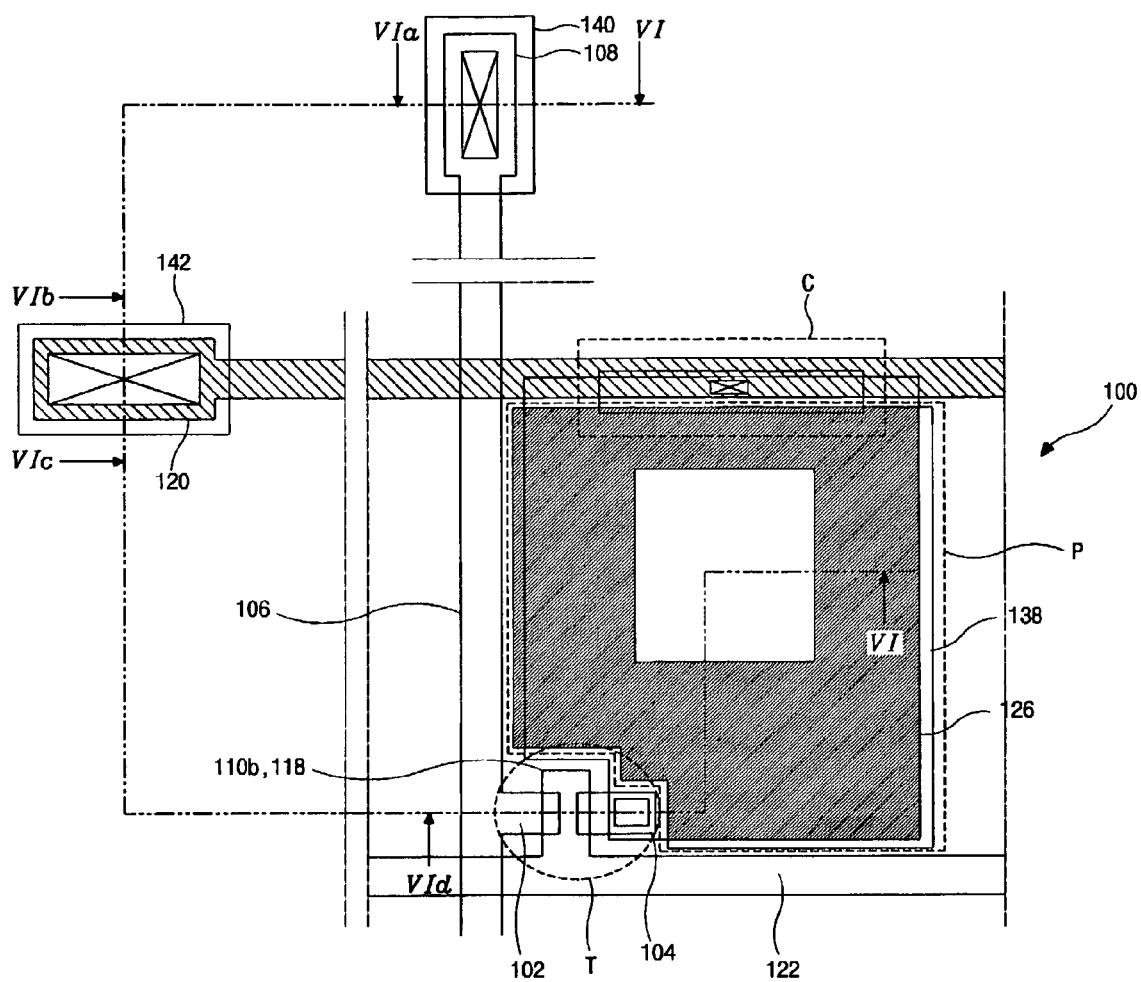
FIG. 5 is a schematic plan view of an array substrate for a transflective liquid crystal display device according to a first embodiment of the present invention.

FIG. 5 is a schematic plan view of an array substrate for a transflective liquid crystal display device according to a first embodiment of the present invention.

In FIG. 5, a gate line 122 and a data line 106 are formed on a substrate 100. The gate line 122 and the data line 106 cross each other to define a pixel region "P." A thin film transistor "T" including source and drain electrodes 102 and 104, an active layer 110b and a gate electrode 118 is connected to the gate line 122 and the data line 106. The source electrode 102 and the gate electrode 118 are connected to the data line 106 and the gate line 122, respectively. The active layer 110b is formed on the source and drain electrodes 102 and 104, and the gate electrode 118 is formed over the active layer 110b. Here, after the gate electrode 118 is patterned, the active layer 110b is patterned by using the gate electrode 118 as an etching mask. Therefore, a fabricating process of an array substrate is simplified.

FIGS. 6A to 6G are schematic cross-sectional views illustrating a fabricating process of an array substrate for a transflective liquid crystal display device according to a first embodiment of the present invention. For the purposes of explanation, FIGS. 6A to 6G are taken along the line VI—VI of FIG. 5.

Figure 6A:
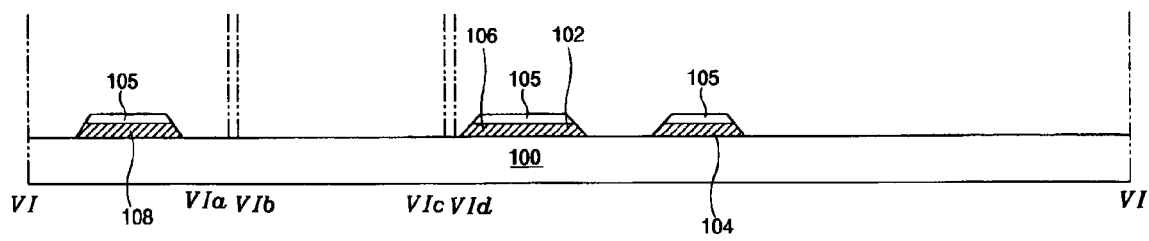
FIGS. 6A to 6G are schematic cross-sectional views illustrating a fabricating process of an array substrate for a transflective liquid crystal display device according to a first embodiment of the present invention.

In FIG. 6A, a first metal layer (not shown) and an impurity-doped amorphous silicon layer (not shown) are sequentially deposited on a substrate 100. The first metal layer has a single layer such as aluminum (Al), aluminum (Al) alloy (e.g., AlNd), tungsten (W), chromium (Cr) and molybdenum (Mo), or a double layer such as Cr/Al, Mo/Al and titanium/Al (Ti/Al). The impurity-doped amorphous silicon layer has n+ or p+ impurities. Next, a photo resist (PR) pattern (not shown) is formed on the impurity-doped amorphous silicon layer through a photolithographic process. The impurity-doped amorphous silicon layer is etched by using the PR pattern as an etching mask to form an ohmic contact layer 105. Sequentially, the first metal layer is etched to form source and drain electrodes 102 and 104, a data line 106 (of FIG. 5) and a data pad 108 at one end of the data line 106 (of FIG. 5). Preferably, the impurity-doped amorphous silicon layer and the first metal layer are etched by using a dry etching method and a wet etching method, respectively. Accordingly, the ohmic contact layer 105 is formed on each of the source and drain electrodes 102 and 104, the data line 106 (of FIG. 5) and the data pad 108. Moreover, since the source and drain electrodes 102 and 104, the data line 106 (of FIG. 5) and the data pad 108 are formed by using the same PR pattern as an etching mask, the ohmic contact layer 105 coincides with each of the source and drain electrodes 102 and 104, the data line 106 (of FIG. 5) and the data pad 108 in plan view. These are referred to as a first mask process.

Figure 6B:
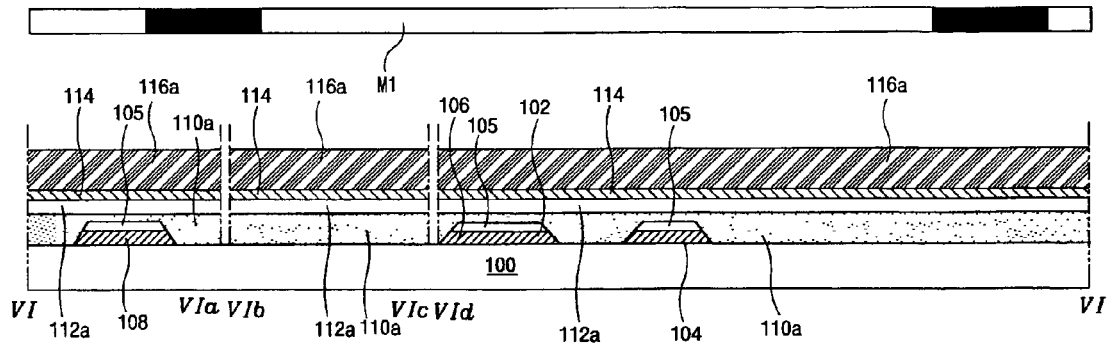

In FIG. 6B, an amorphous silicon (a-Si:H) layer 110a, a first insulating layer 112a and a second metal layer 114 are sequentially deposited on an entire surface of the substrate 100. The first insulating layer 112a has one of inorganic insulating material group including silicon nitride (SiNx) and silicon oxide ($SiO_2$). The second metal layer similar to the first metal layer has a single layer such as Al, Al alloy (e.g., AlNd), W, Cr and Mo, or a double layer such as Cr/Al, Mo/Al and Ti/Al. Next, after a photoresist (PR) layer 116a is formed on the second metal layer 114, an exposure process using a second photo mask "M1" disposed over the PR layer 116a and a development process are performed.

Figure 6C:
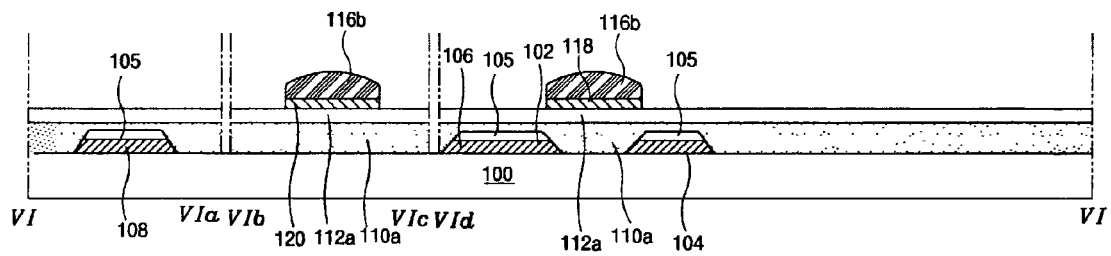

In FIG. 6C, after forming a PR pattern 116b, a gate electrode 118 and a gate pad 120 are formed through etching the second metal layer 114 (of FIG. 6B) by using the PR pattern 116b as an etching mask. The gate electrode 118 is formed over the source and drain electrodes 102 and 104. The gate pad 120 is formed at one end of the gate line 122 (of FIG. 5).

Figure 6D:
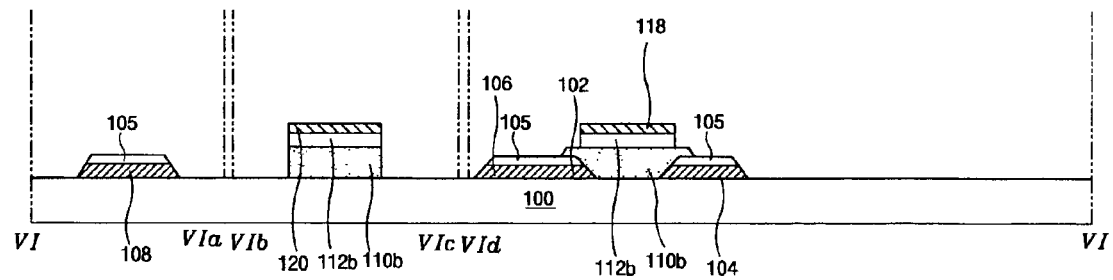

In FIG. 6D, after etching the first insulating layer 112a (of FIG. 6B), an active layer 110b is formed through etching the amorphous silicon layer 110a. Here, the first insulating layer 112a (of FIG. 6B) is also etched by using the PR pattern 116b (of FIG. 6B) as an etching mask to form a gate insulating pattern 112b on the active layer 110b. Moreover, the active layer 110b coincides with the gate line 122 (of FIG. 5), the gate electrode 118 and the gate pad 120 in plan view. Next, the PR pattern 116b (of FIG. 6B) is stripped. Accordingly, an additional mask process for forming the active layer 110b is omitted.

Figure 6E:
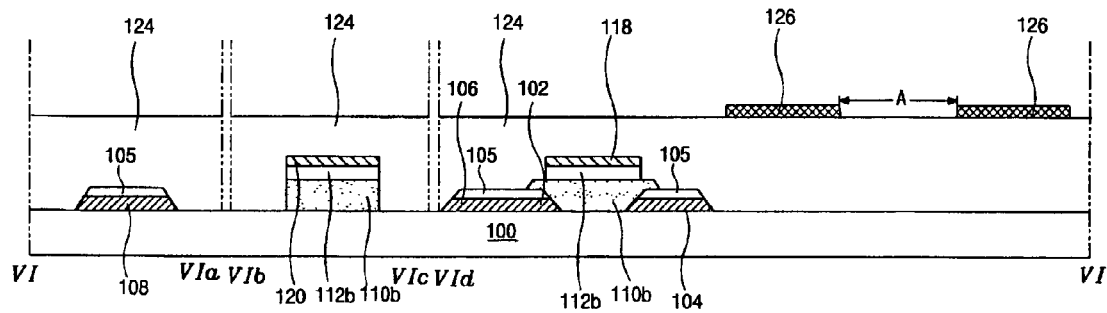

In FIG. 6E, a second insulating layer 124 is formed on an entire surface of the substrate 100 through depositing a transparent organic insulating material group including benzocyclobutene (BCB) and acrylic resin. After one of a high reflective metallic material group including Al and Al alloy (e.g., AlNd) is deposited on the second insulating layer 124, a reflective plate 126 having a transmissive hole "A" corresponding to the pixel region "P" (of FIG. 5) is formed through a third mask process.

Figure 6F:
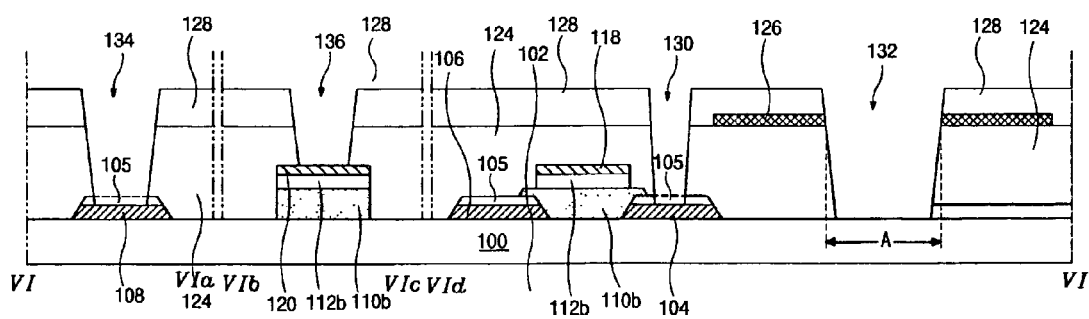

In FIG. 6F, a third insulating layer 128 is formed on an entire surface of the substrate 100 through depositing one of an inorganic insulating material group including SiNx and $SiO_2$, or an organic insulating material group including BCB and acrylic resin. A drain contact hole 130, a transmissive groove 132, a data pad contact hole 134 and a gate pad contact hole 136 are formed through a fourth mask process of etching the second and third insulating layers 124 and 128 at the same time. The drain contact hole 130 exposes the drain electrode 104 and the transmissive groove 132 corresponds to the transmissive hole "A". The data pad contact hole 134 and the gate pad contact hole 136 expose the data pad 108 and the gate pad 120, respectively. Here, the ohmic contact layer 105 on the drain electrode 104 and the data pad 108 is partially eliminated.

Figure 6G:
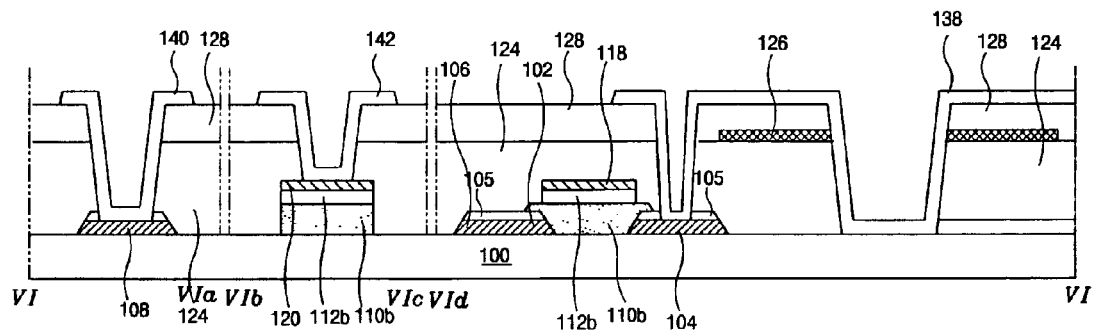

In FIG. 6G, after one of transparent conductive material such as indium-tin-oxide (ITO) and indium-zinc-oxide (IZO) is deposited on the third insulating layer 128, a pixel electrode 138 contacting the drain electrode 104 is formed through a fifth mask process. At the same time, a data pad terminal 140 contacting the data pad 108 and a gate pad terminal 142 contacting the gate pad 120 are formed.

To improve a display quality, another embodiment including a reflective plate of an uneven shape is suggested.

Figure 7:
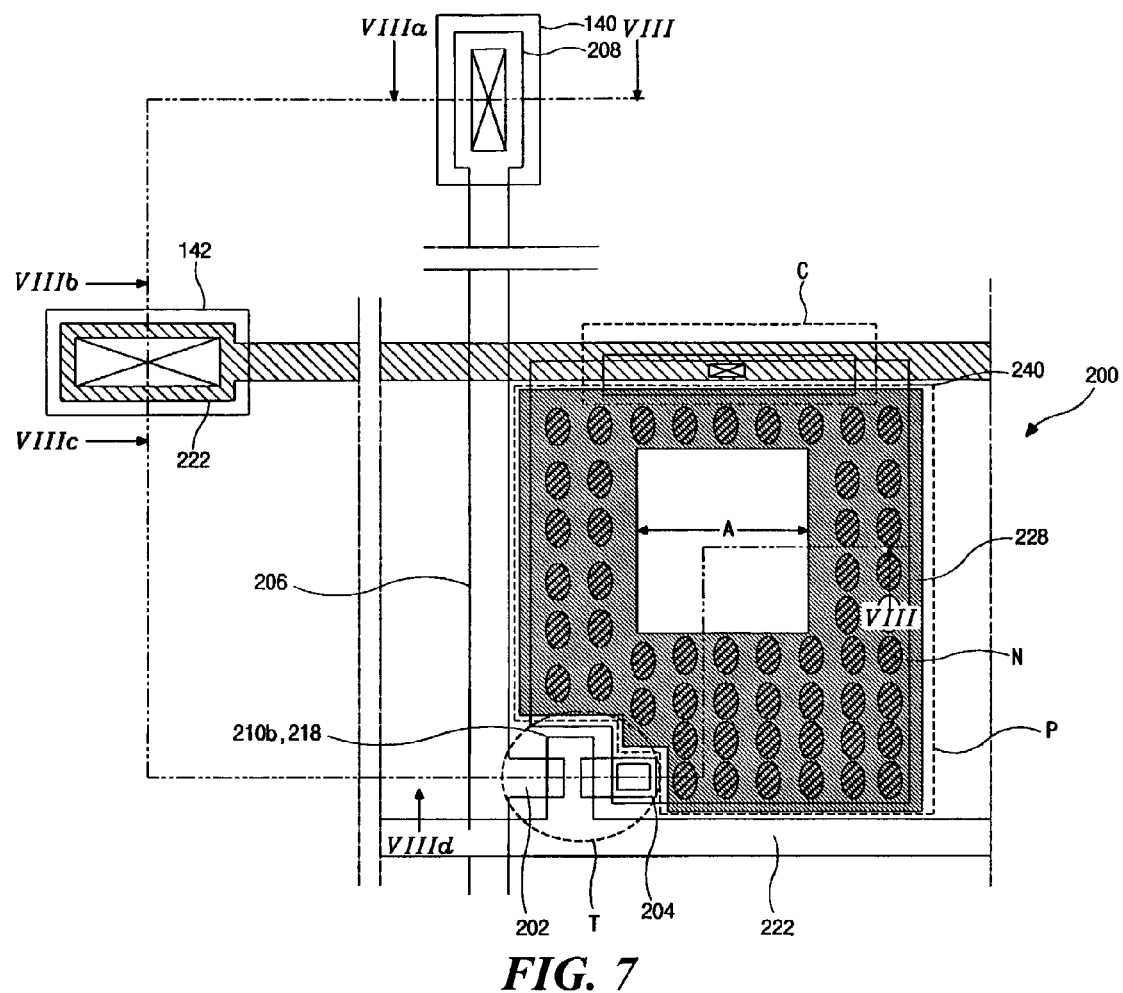
FIG. 7 is a schematic plan view of an array substrate for a transflective liquid crystal display device according to a second embodiment of the present invention.

FIG. 7 is a schematic plan view of an array substrate for a transflective liquid crystal display device according to a second embodiment of the present invention.

In FIG. 7, a gate line 222 and a data line 206 are formed on a substrate 200. The gate line 222 and the data line 206 cross each other to define a pixel region "P". A thin film transistor (TFT) "T" including source and drain electrodes 202 and 204, an active layer 210b and a gate electrode 218 is connected to the gate line 222 and the data line 206. The source electrode 202 and the gate electrode 218 are connected to the data line 206 and the gate line 222, respectively. Here, the TFT "T" is a staggered top gate type that the active layer 210b is formed on the source and drain electrodes 202 and 204, and the gate electrode 218 is formed over the active layer 210b. Since the active layer 210b is patterned by using the gate electrode 218 as an etching mask after patterning the gate electrode 218, the active layer 210b coincides with the gate electrode 218 and the gate line 222 in plan view, and a gate insulating layer (not shown) is interposed therebetween. A pixel electrode 240 and a reflective plate 228 having a transmissive hole "A" are formed at the pixel region "P." Here, the uneven shape of the reflective plate 228 forms a plurality of convex patterns "N" including the plurality of gate patterns 224 (of FIG. 8D), the gate insulating pattern 212b (of FIG. 8D) and the active layer 210b are formed at the pixel region "P" at the same time under the reflective plate 228.

FIGS. 8A to 8G are schematic cross-sectional views illustrating a fabricating process of an array substrate for a transflective liquid crystal display device according to a second embodiment of the present invention. For the purposes of explanation, FIGS. 8A to 8G are taken along the line VIII—VIII of FIG. 7.

Figure 8A:
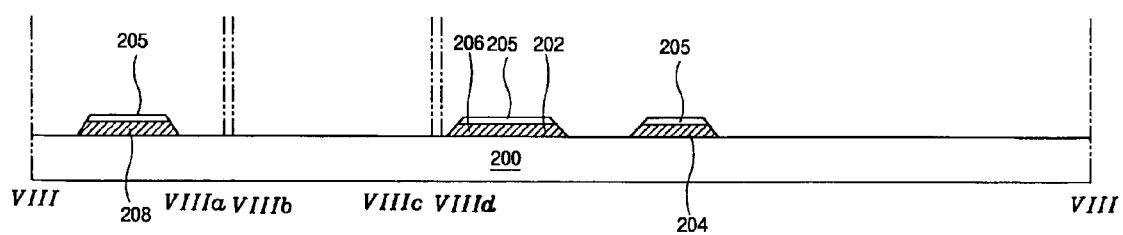
FIGS. 8A to 8G are schematic cross-sectional views illustrating a fabricating process of an array substrate for a transflective liquid crystal display device according to a second embodiment of the present invention.

In FIG. 8A, a first metal layer (not shown) and an impurity-doped amorphous silicon layer (not shown) are sequentially deposited on a substrate 200. The first metal layer has a single layer such as aluminum (Al), aluminum (Al) alloy (e.g., AlNd), tungsten (W), chromium (Cr) and molybdenum (Mo), or a double layer such as Cr/Al, Mo/Al and titanium/Al (Ti/Al). The impurity-doped amorphous silicon layer has n+ or p+ impurities. Next, a photo resist (PR) pattern (not shown) is formed on the impurity-doped amorphous silicon layer through a photolithographic process. The impurity-doped amorphous silicon layer using the PR pattern as an etching mask to form an ohmic contact layer 205. Sequentially, the first metal layer is etched to form source and drain electrodes 202 and 204, a data line 106 (of FIG. 5) and a data pad 108 at one end of the data line 106 (of FIG. 5). Preferably, the impurity-doped amorphous silicon layer and the first metal layer are etched by using a dry etching method and a wet etching method, respectively. Accordingly, the ohmic contact layer 205 is formed on each of the source and drain electrodes 202 and 204, the data line 206 (of FIG. 7) and the data pad 208. Moreover, since the source and drain electrodes 202 and 204, the data line 206 (of FIG. 7) and the data pad 208 are formed by using the same PR pattern as an etching mask, the ohmic contact layer 205 coincides with each of the source and drain electrodes 202 and 204, the data line 206 (of FIG. 7) and the data pad 208 in plan view. These are referred to as a first mask process.

Figure 8B:
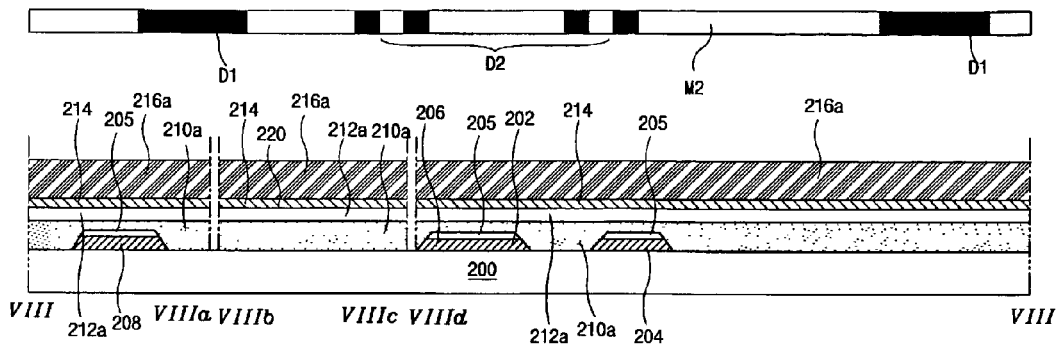

In FIG. 8B, an amorphous silicon (a-Si:H) layer 210a, a first insulating layer 212a and a second metal layer 214 are sequentially deposited on an entire surface of the substrate 200. The first insulating layer 212a has one of inorganic insulating material group including silicon nitride (SiNx) and silicon oxide (SiO$_2$). The second metal layer similar to the first metal layer has a single layer such as Al, Al alloy (e.g., AlNd), W, Cr and Mo, or a double layer such as Cr/Al, Mo/Al and Ti/Al. Next, after a photoresist (PR) layer 216a is formed on the second metal layer 214, an exposure process using a second photo mask "M2" disposed over the PR layer 216a and a development process are performed.

Figure 8C:
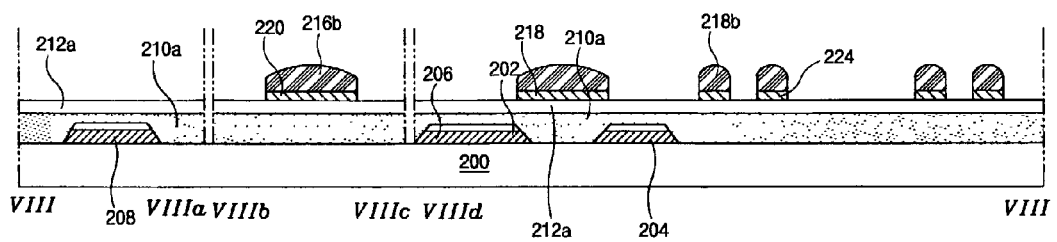

In FIG. 8C, after forming a PR pattern 216b, a gate electrode 218 and a gate pad 220 are formed through etching the second metal layer 214 (of FIG. 8B) by using the PR pattern 216b as an etching mask. The gate electrode 218 is formed over the source and drain electrodes 202 and 204. The gate pad 220 is formed at one end of the gate line 222 (of FIG. 7). At the same time, a plurality of gate patterns 224 are formed at a pixel region "P" (of FIG. 7).

Figure 8D:
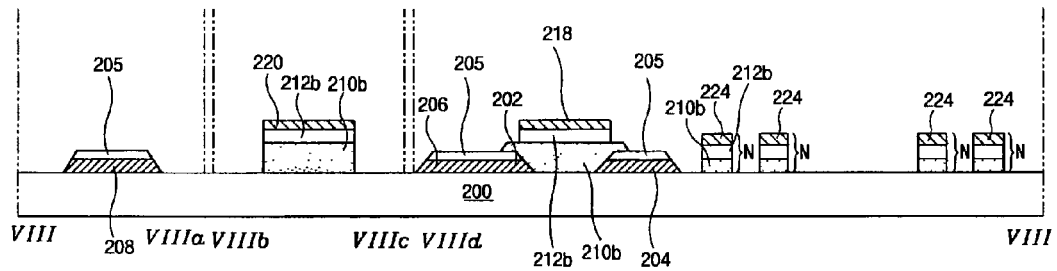

In FIG. 8D, after etching the first insulating layer 212a (of FIG. 8B), an active layer 210b is formed through etching the amorphous silicon layer 210a. Here, the first insulating layer 212a (of FIG. 8B) is also etched by using the PR pattern 216b (of FIG. 8B) as an etching mask to form a gate insulating pattern 212b on the active layer 210b. Moreover, the active layer 210b coincides with the gate line 222 (of FIG. 7), the gate electrode 218 and the gate pad 220 in plan view. Next, the PR pattern 216b (of FIG. 8B) is stripped. Accordingly, an additional mask process for forming the active layer 210b is omitted. Here, a plurality of convex patterns "N" including the plurality of gate patterns 224, the gate insulating pattern 212b and the active layer 210b are formed at the pixel region "P" (of FIG. 7) at the same time.

Figure 8E:
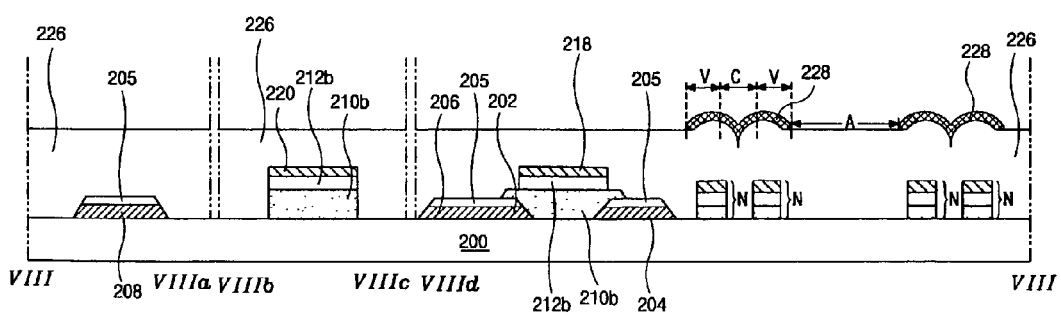

In FIG. 8E, a second insulating layer 226 is formed on an entire surface of the substrate 200 through depositing a transparent organic insulating material group including benzocyclobutene (BCB) and acrylic resin. After one of a high reflective metallic material group including Al and Al alloy (e.g., AlNd) is deposited on the second insulating layer 226, a reflective plate 228 having a transmissive hole "A" corresponding to the pixel region "P" is formed through a third mask process. Since the reflective plate 228 is formed over the plurality of convex patterns "N," the reflective plate 228 has an unevenness that a convex portion "V" and a concave portion "C" are alternated.

Figure 8F:
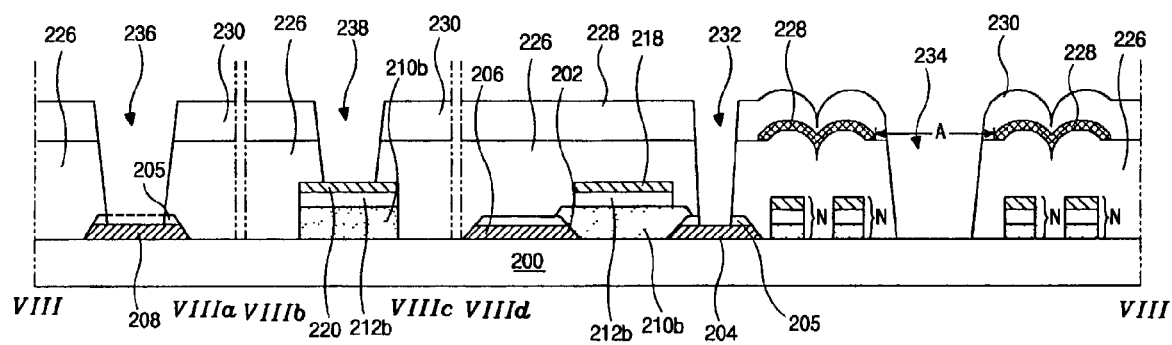

In FIG. 8F, a third insulating layer 230 is formed on an entire surface of the substrate 200 through depositing one of an inorganic insulating material group including SiNx and SiO$_2$, or an organic insulating material group including BCB and acrylic resin. A drain contact hole 232, a transmissive groove 234, a data pad contact hole 236 and a gate pad contact hole 238 are formed through a fourth mask process of etching the second and third insulating layers 226 and 230 at the same time. The drain contact hole 232 exposes the drain electrode 204 and the transmissive groove 234 corresponds to the transmissive hole "A". The data pad contact hole 236 and the gate pad contact hole 238 expose the data pad 208 and the gate pad 220, respectively. Here, the ohmic contact layer 205 on the drain electrode 204 and the data pad 208 is partially eliminated.

Figure 8G:
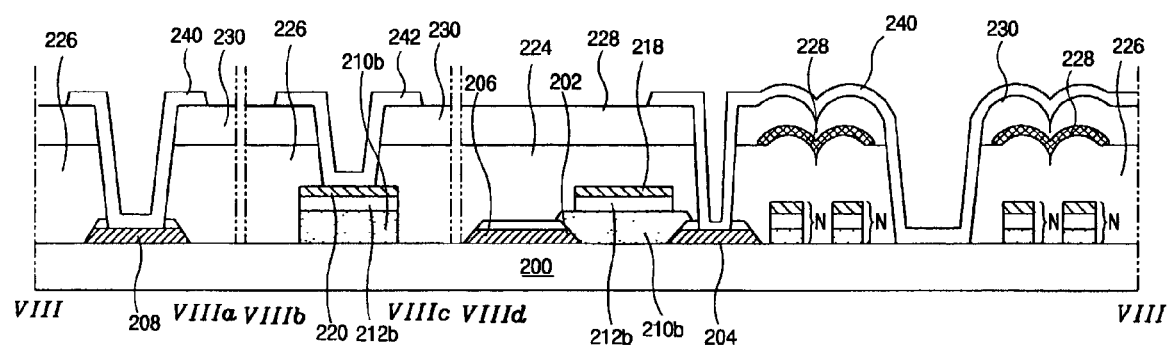

In FIG. 8G after one of transparent conductive material such as indium-tin-oxide (ITO) and indium-zinc-oxide (IZO) is deposited on the third insulating layer 230, a pixel electrode 240 contacting the drain electrode 204 is formed through a fifth mask process. At the same time, a data pad terminal 240 contacting the data pad 208 and a gate pad terminal 242 contacting the gate pad 220 are formed.

Consequently, an array substrate according to the present invention has some advantages. First, since the number of mask processes is reduced, the production yield and the production cost are improved. Second, since the reflective plate has an unevenness, the reflective property and the display quality are improved.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An array substrate for a transflective liquid crystal display device, comprising:
    a transflective liquid crystal display substrate;
    a data line and a gate line on the substrate, the data line and the gate line defining a pixel region;
    a thin film transistor connected to the data line and the gate line, the thin film transistor including source and drain electrodes, an ohmic contact layer on the source and drain electrodes, an active layer partially disposed on the ohmic contact layer and a gate electrode over the active layer, wherein the ohmic contact layer is disposed over the entire top surface of the source and drain electrodes, wherein the source electrode, drain electrode, and active layer are in contact with the substrate, and wherein the source electrode and the drain electrode include metal;
    a reflective plate at the pixel region, the reflective plate having a transmissive hole; and
    a pixel electrode over the reflective plate, the pixel electrode being connected to the drain electrode.

2. The substrate according to claim 1, further comprising a first insulating layer between the active layer and the gate electrode.

3. The substrate according to claim 2, further comprising a second insulating layer covering the thin film transistor, wherein the reflective plate is formed on the second insulating layer.

4. The substrate according to claim 3, further comprising a third insulating layer on the reflective plate, wherein the third insulating layer has a drain contact hole and a transmissive groove through the second insulating layer, wherein the pixel electrode is formed on the third insulating layer and connected to the drain electrode through the drain contact hole.

5. An array substrate for a transflective liquid crystal display device, comprising:
    a transflective liquid crystal display substrate;
    a data line and a gate line on the substrate, the data line and the gate line defining a pixel region;
    a thin film transistor connected to the data line and the gate line, the thin film transistor including source and drain electrodes, an ohmic contact layer on the source and drain electrodes, an active layer partially disposed on the ohmic contact layer and a gate electrode over the active layer, wherein the ohmic contact layer is disposed over the entire top surface of the source and drain electrodes, the source electrode, drain electrode, and active layer are in contact with the substrate, wherein the source electrode and the drain electrode include metal;
    a reflective plate at the pixel region, the reflective plate having a transmissive hole and an unevenness;
    a plurality of convex patterns under the reflective plate; and
    a pixel electrode over the reflective plate, the pixel electrode being connected to the drain electrode.

6. The substrate according to claim 5, wherein the plurality of convex patterns corresponds to the unevenness.

7. The substrate according to claim 5, further comprising a first insulating layer between the active layer and the gate electrode.

8. The substrate according to claim 7, further comprising a second insulating layer covering the thin film transistor, wherein the reflective plate is formed on the second insulating layer.

9. The substrate according to claim 8, further comprising a third insulating layer on the reflective plate, wherein the third insulating layer has a drain contact hole and a transmissive groove through the second insulating layer, wherein the pixel electrode is formed on the third insulating layer and connected to the drain electrode through the drain contact hole.

10. The substrate according to claim 9, wherein the plurality of convex patterns has the same structure as a multi-layer including the active layer, the first insulating layer and the gate electrode.

* * * * *